Patented June 23, 1931

1,811,808

UNITED STATES PATENT OFFICE

LAWRENCE V. REDMAN, ARCHIE J. WEITH, AND FRANK P. BROCK, OF EVANSTON, ILLINOIS, ASSIGNORS TO BAKELITE CORPORATION, OF NEW YORK, N. Y., A CORPORATION OF DELAWARE

PHENOLIC CONDENSATION PRODUCT AND PROCESS OF PRODUCING THE SAME

No Drawing.    Application filed May 23, 1921. Serial No. 471,918.

This invention relates to a composition of matter comprising a phenolic condensation product and to a process of producing such composition of matter.

The primary object is to provide an improved molding composition and an improved method of producing the same.

Briefly stated, the improved process consists in combining a fusible non-reactive phenolic condensation product containing a substantial amount of a free phenolic body with an appropriate amount of a substance adapted to convert, or substantially convert, the free phenolic body of the fusible resin into a phenolate, the phenolate being highly non-reactive in character; then mixing the product (when cool or in solid condition) with a sufficient quantity of a methylene body to allow the conversion of the non-reactive resin to the infusible and substantially insoluble condition; and then mixing with the potentially reactive product thus obtained suitable filling materials, preferably fibrous fillers, such as asbestos or wood flour.

The improved process renders it possible to produce a molding composition without the necessity of plasticizing the composition on the differential rolls. It also enables a molding composition to be produced which can be more quickly molded than phenolic condensation product molding compositions heretofore known. It also enables a saving to be effected in the use of the phenolic condensation product in preparing a molding composition; and it furthermore enables a molded product of greater uniformity and higher tensile strength to be produced than is attainable by known methods.

The improved process furthermore enables a successful molding composition comprising a phenolic condensation product and asbestos to be prepared in such manner as to yield a highly successful molded product which is fireproof in its nature. It may be stated here that in the known processes where the mixing of asbestos with a phenolic condensation product is effected by means of differential rolls adapted to produce a plasticizing effect, the fiber of the asbestos is so largely destroyed as to render the product practically worthless. Nevertheless, no other method has heretofore been available for obtaining a sufficiently intimate mixture of the ingredients and a sufficient homogeneity to insure proper conversion of the product in the heated molds, prevent sticking of the molded product to the molds, and obviate injury to the molded product.

The present invention is based upon the discovery that it is possible, after producing a fusible non-reactive condensation product resin which contains a certain percentage of a free phenolic body to convert the free phenolic body into a comparatively inert (chemically) compound which is innocuous in character, so that in the molding process the free methylene body, in practical effect, has to react only on the fusible condensation product resin, which is capable of being thus quickly converted to the final infusible and substantially insoluble state. Thus, the molding composition may be quickly converted in the heated molds to the hard resistant final condition which is desirable.

Methods of producing a fusible non-reactive phenolic condensation product are described in numerous patents. For example, Redman Patent No. 1,188,014, granted June 20, 1916 describes a method of producing such phenolic condensation product by combining a phenolic body with hexamethylenetetramine; and our Patents No. 1,310,088, granted July 15, 1919, No. 1,310,087, granted July 15, 1919, and No. 1,345,694, granted July 6, 1920 describe methods of producing such phenolic condensation product by combining formaldehyde with a phenolic body.

Briefly stated, this is effected by boiling together a phenolic body, such as phenol, or a cresol, and a methylene body, the phenolic body being taken in considerable excess, that is, there being present considerably more than one phenolic group to each methylene group when the condensation is effected. It is stated in Patent No. 1,188,014 that the method here referred to results in the production of a fusible, soluble phenolic condensation product (phenyl-endekasaligeno-saligenin) and a percentage of free phenol. The condensation product itself is capable of being quickly converted to the final hard infusible and substantially insoluble condition when a comparatively small amount of a methylene body is mixed with the fusible resin and the mixture subjected to heat. It is, however, incapable of such conversion in the absence of added methylene groups, and is therefore herein termed "non-reactive."

In preparing the fusible phenolic condensation product, it is desirable to employ, in the first instance, a large excess of the phenolic body. Our Patents No. 1,242,592 and No. 1,242,593 describe methods by which, after the production of the fusible resin, a portion of the excess phenol may be eliminated by a blowing process, thus bringing the resin, although still fusible and non-reactive, to a point where the proportions between the methylene body and the phenolic body correspond more closely with the proportions which give the final infusible and substantially insoluble product.

Where the methylene body employed in producing the fusible resin is hexamethylenetetramine, the proportions which correspond with the final product are substantially one mol of hexamethylenetetramine to 6 mols of phenol; and where the methylene body employed is formaldehyde, the proportions are substantially equal volumes or equimolecular portions.

According to the present process, a fusible and soluble non-reactive phenolic condensation product having present or incorporated therein a certain percentage of a free phenolic body is prepared by any suitable process.

The fusible mass which it is preferred to employ in the present process corresponds with substantially 1.25 phenolic groups to each methylene group. Where the methylene body employed is hexamethylenetetramine, this means about 7½ mols of the phenols to one mol of hexamethylenetetramine. Such a mass may be prepared, for example, by boiling together these materials in the proportions of one mol of hexamethylenetetramine to about nine mols of the phenols until the reaction is complete, and then blowing out of the mass a sufficient quantity of the free phenols to gain the desired proportions stated.

However, the proportions used, in the first instance, may vary, and also the proportions between the condensation product and the free phenols of the mass to be employed in the present process may vary. It is not safe practice to reduce the proportion of free phenol much beyond the point which corresponds with 1.25 phenolic groups to each methylene group in the mass, as to do so would render the practice of the process less easy and incur the danger of the resin or a part of it passing to the infusible condition. On the other hand, the proportion of the phenols with respect to the methylenes may be increased considerably, say to the ratio of one and one-third phenolic groups to each methylene group, or even higher, without endangering the process; and the effect would be to increase the proportions of phenolate in the final product. If this were carried too far, it would unduly weaken the product.

A specific example of the preferred method of practicing the process may be stated as follows:

Boil together in a still for two hours, preferably at about 200° C., with continuous rapid stirring, 74 pounds of calcium hydrate ($Ca(OH)_2$) and 877 pounds of a mass comprising a phenolic condensation product resin and a free phenolic body, the mass corresponding with approximately 1 and ¼ phenolic groups to each methylene group; then cool the mass; then coarse-break the mass and grind it; then mix with the comminuted material enough hexamethylenetetramine to convert the fusible condensation product to an infusible condition, which in this case amounts to about 52½ pounds of hexamethylenetetramine, that is, six per cent of the condensation product and free phenolic body; then pulverize the mixture in a beater-mill to about 200 mesh; then blend the mixture in a stirring mill; and finally mix the mixture thus obtained with a suitable filler, preferably a fibrous filler. This operation may be performed in a ball-mill, or in a tumbling-mill. It will be found that by this method asbestos may be quite uniformly incorporated in the mass, without destroying the fiber of the asbestos. Wood flour, cotton flock, or other filler may be introduced in the same way.

The product thus obtained may be successfully molded in a hot press more advantageously than has hitherto been possible.

We have found, for example, that in molding some of the larger articles it has been possible to reduce the hot molding period to one-half and even to one-third of the time required for hot-molding phenolic condensation product molding compositions now upon the market.

Processes of cold molding for phenolic condensation products are now available. Such processes are described, for example, in our Patents Nos. 1,339,134, granted May 4, 1920, and 1,358,394 granted November 9, 1920. Such processes enable a very large output to be obtained from a single mold, but the molded product must then be subjected to a baking operation after removal from the mold. Such processes do not result in an article of the same fine finish and high tensile strength as that which can be produced by the hot molding process. Therefore, it is of enormous value to the art to shorten the length of the molding operation in the hot-molding of phenolic condensation product articles.

Our Patents Nos. 1,242,592 and 1,242,593 describe methods of producing molding compositions for hot molding operations. As pointed out, however, the methods there described are not well adapted to the production of a high-grade molded product in which the filler employed is asbestos. Moreover, the plasticizing process there employed is rather slow and expensive. By the improved process herein described, the cost of the molding composition may be considerably cheapened because of the labor-saving which is effected, and, furthermore, it is possible, by the improved process, to employ a lower percentage of the phenolic condensation product resin in the molding composition and still obtain as good or better results than have heretofore been possible. For example, the amount of resin employed in the molding composition may be reduced from 15 per cent to 30 per cent over molding compositions now on the market, and still obtain a fine finish in the molded product and a tensile strength as high or higher than that now obtainable.

In the example given above, calcium hydroxide is employed to convert the free phenol of the mass into a phenolate. This occurs in accordance with the following equation:

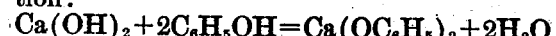
$Ca(OH)_2 + 2C_6H_5OH = Ca(OC_6H_5)_2 + 2H_2O$

In the example given, about 36 pounds of water are produced and this is eliminated by the boiling operation in the still. One may employ, instead of calcium hydroxide, or hydrated lime, the oxide or carbonate of calcium; or the oxide, hydroxide or carbonate of other metals, such as magnesium, iron, zinc, sodium or potassium may be employed. It is preferred, however, to employ a compound which will yield a substantially insoluble phenolate; and slaked lime is cheap and probably best answers the purpose. The phenolate remains in solid solution in the resin and produces no deleterious effect, unless the proportion be increased unduly, which would have a tendency to weaken the product.

It is desirable to introduce into the molding compound, at the proper stage, a small amount of fats or waxes, and suitable dyes or pigments may be introduced, if desired. As explained in Patent No. 1,242,592, the fat or wax tends to prevent the molded product from sticking to the molds. If desired, one may incorporate in the resinous mass a comparatively small percentage of the cyclic hydrocarbons, such as creosote oil. This may be done in the process of producing the fusible phenolic condensation product, if desired, or it may be done at the stage where such product is boiled with calcium hydroxide, for example. Anywhere from 1 to 10 per cent of creosote oil may be employed. This may be advisable, where increased penetrating power is desirable and where very high tensile strength is less essential. The creosote oil tends to increase the fluidity of the mass during the boiling operation, and remains in the product and tends to give a desirable increase of plasticity to the molding composition in the molding operation, the penetrating effect being increased.

It should be remarked, however, particularly where the filler employed is asbestos, that too great fluidity of the resin under heat is to be avoided. It was found, for example, that in attempting to hot mold the molding compositions produced on the differential rolls, where the filler employed was asbestos, there was a tendency for a liquid to be exuded, causing the molded product to stick to the molds; and an expensive molded article might be ruined. This tendency was noted, notwithstanding the fact that there was a sufficient amount of free methylene substance in the molding composition to convert the fusible resin and the free phenolic body to the final infusible condensation product. This great difficulty has been overcome by converting the free phenol of the resinous mass into a phenolate, as stated above.

The active methylene body which is to be incorporated in the mass, after the conversion of the free phenol to a phenolate, may be any suitable body. Hexamethylenetetramine, paraformaldehyde, or tri-oxy-methylene, which are solids, may be best employed. In the claims the term "active methylene body" is intended to comprise those compounds containing a methylene group which when added to a fusible phenolic condensation product will cause it to become infusible on heating.

The fillers employed in producing the molding composition may be employed in the proportions heretofore employed in producing similar molding compositions, or may be employed in considerably larger proportions than have heretofore been employed in connection with phenolic condensation product molding compositions. For example, the filler may range as high as 60 per cent of the molding composition and still produce a molded article of good finish and sufficiently high tensile strength for a great many purposes.

Any suitable phenolic body may be employed. The phenols, which include phenol proper and the cresols, and xylenols may be employed. Where cresols are employed, a cresolate is formed when the mass is treated with calcium hydroxide, for example. Any suitable compound for converting the free phenols of the resin into compounds which do not readily react with an active methylene body may be employed. Where the expression "phenolate" is employed in the accompanying claims, the cresolates, for example, should be regarded as equivalents, this term being intended to comprise the neutralization products of the unreacted aromatic phenols used as raw materials in the production of phenolic condensation products.

The foregoing detailed description has been given for clearness of understanding only, and no unnecessary limitations should be understood therefrom, but the appended claims should be construed as broadly as permissible in view of the prior art.

What we regard as new, and desire to secure by Letters Patent, is—

1. In a process of the character set forth, the step which comprises producing a reaction between a mass comprising a fusible non-reactive condensation product and a free phenolic body, and a substance adapted to convert the free phenolic body into a compound which will not readily react with an active methylene body.

2. In a process of the character set forth, the step which comprises reacting upon a mass comprising a fusible non-reactive phenolic condensation product and a free phenolic body with a substance which will substantially convert the free phenolic body into a phenolate.

3. In a process of the character set forth, the step which comprises reacting upon a mass comprising a fusible non-reactive phenolic condensation product and a free phenolic body with a substance which will convert the free phenolic body into a substantially insoluble phenolate.

4. In a process of the character set forth, the step which comprises reacting upon a mass comprising a fusible non-reactive phenolic condensation product and a free phenolic body with a compound of calcium, which will act as a base.

5. In a process of the character set forth, the step which comprises reacting upon a mass comprising a fusible non-reactive phenolic condensation product and a free phenolic body with a compound of calcium and oxygen.

6. In a process of the character set forth, the step which comprises reacting upon a mass comprising a fusible non-reactive phenolic condensation product and a free phenolic body with a compound of calcium, oxygen and hydrogen.

7. The process which comprises reacting upon a mass comprising a fusible phenolic condensation product and a free phenolic body with a substance which will convert the free phenolic body into a compound which will not react readily with an active methylene body; and then incorporating in the mass an active methylene body in sufficient quantity to convert the fusible condensation product to the final infusible state.

8. The process which comprises reacting upon a mass comprising a fusible phenolic condensation product and a free phenolic body with a substance which will convert the free phenolic body into a compound which will not react readily with an active methylene body; and then incorporating in the mass a filler and a sufficient amount of an active methylene body to convert the fusible condensation product to the infusible state.

9. The process which comprises reacting upon a mass comprising a fusible phenolic condensation product and a free phenolic body with a substance which will convert the free phenolic body into a compound which will not react readily with a free methylene body; then incorporating in the mass an active methylene body in the form of a solid; and then mixing with the mass a fibrous filler.

10. A process which comprises reacting upon a mass comprising a fusible phenolic condensation product and a free phenolic body with a substance which will convert the free phenolic body into a phenolate; and then incorporating into the mass a fibrous filler and a sufficient quantity of an active methylene body to substantially convert the fusible condensation product to an infusible state.

11. The process which comprises boiling a mass which comprises a fusible phenolic condensation product and a free phenolic body in the presence of a substance adapted to convert the phenols into a phenolate; then cooling and pulverizing the mass and incorporating therewith a sufficient quantity of an active methylene body to convert the fusible condensation product to an infusible state; and then mixing with the mass a fibrous filler.

12. The process which comprises boiling a mass comprising a fusible phenolic condensation product and a free phenolic body with a substance which will convert the free phenolic body into a phenolate; then cooling the mass and reducing it to a finely pulverulent condition and incorporating with the mass an active methylene body in the form of a solid; and then mixing with the mass a fibrous filler without substantially plasticizing the mixture.

13. The process which comprises boiling a mass comprising a fusible phenolic condensation product and a free phenolic body with a substance which will convert the free phenolic body into a phenolate; then cooling the mass and reducing it to a finely pulverulent condition and incorporating with the mass an active methylene body in the form of a solid; and then mixing with the mass a fibrous material without rolling the mixture into sheet form.

14. The process which comprises boiling a mass which comprises a fusible phenolic condensation product and a free phenolic body with a substance which will convert the free phenolic body into a phenolate; then cooling and breaking the mass and mixing with it an active methylene body in solid form; then reducing the mixture to finely pulverulent condition and suitably blending the materials, and then mixing therewith a fibrous filler.

15. The process which comprises reacting upon a mass comprising a fusible phenolic condensation product and a free phenolic body with a substance which will convert the free phenolic body into a compound which will not react readily with an active methylene body; then incorporating in the mass a sufficient quantity of an active methylene body to convert the fusible condensation product to an infusible state; and then mixing with the mass an asbestos filler without substantially plasticizing the mixture.

16. A composition of matter comprising a fusible phenolic condensation product, a phenolate in minor proportions, and an active methylene body in sufficient quantity to convert the fusible condensation product to the final infusible state.

17. A molding composition comprising a comminuted mass of an intimately mixed fusible phenolic condensation product, phenolate, and an active methylene body.

18. A molding composition comprising a comminuted mass of an intimately mixed fusible phenolic condensation product, phenolate, and an active methylene body in solid form.

19. A molding composition comprising a fusible phenolic condensation product, a phenolate in relatively small proportion, a relatively small proportion of an active methylene body, and a fibrous filler, said materials being intimately admixed and blended.

20. A molding composition comprising a fusible phenolic condensation product, a substantially insoluble phenolate in relatively small proportion, a solid active methylene body in relatively small proportion, and a fibrous filler, said materials being intimately admixed and in pulverulent form, except as to the fibrous filler.

21. A molding composition comprising a fusible phenolic condensation product, a phenolate in relatively small proportions, a solid methylene body in relatively small proportion, said materials being finely comminuted and blended, and an asbestos filler mixed with said material.

LAWRENCE V. REDMAN.
ARCHIE J. WEITH.
FRANK P. BROCK.